United States Patent
Zhu

(10) Patent No.: US 12,210,928 B2
(45) Date of Patent: Jan. 28, 2025

(54) DATA TRANSMISSION METHOD AND DATA PROCESSING METHOD, DISTRIBUTED UNIT, RADIO UNIT, AND COMPUTER-READABLE STORAGE MEDIUM

(71) Applicant: SANECHIPS TECHNOLOGY CO., LTD., Guangdong (CN)

(72) Inventor: Shaobin Zhu, Guangdong (CN)

(73) Assignee: SANECHIPS TECHNOLOGY CO., LTD., Guangdong (CN)

( * ) Notice: Subject to any disclaimer, the term of this patent is extended or adjusted under 35 U.S.C. 154(b) by 0 days.

(21) Appl. No.: 18/027,402

(22) PCT Filed: Sep. 7, 2021

(86) PCT No.: PCT/CN2021/116905
§ 371 (c)(1),
(2) Date: Mar. 21, 2023

(87) PCT Pub. No.: WO2022/057680
PCT Pub. Date: Mar. 24, 2022

(65) Prior Publication Data
US 2023/0334273 A1 Oct. 19, 2023

(30) Foreign Application Priority Data
Sep. 21, 2020 (CN) .......................... 202010994936.6

(51) Int. Cl.
*G06K 7/10* (2006.01)
(52) U.S. Cl.
CPC ................................. *G06K 7/10366* (2013.01)

(58) Field of Classification Search
CPC ............................. G06F 15/78; G06K 7/10366
USPC .......................................................... 235/451
See application file for complete search history.

(56) References Cited

U.S. PATENT DOCUMENTS 9,496,039 B2 11/2016 Yin et al.

FOREIGN PATENT DOCUMENTS

| JP | 2001016258 A | 1/2001 |
|----|--------------|--------|
| JP | 2004172824 A | 6/2004 |
| JP | 2004200996 A | 7/2004 |
| JP | 2006217600 A | 8/2006 |

(Continued)

OTHER PUBLICATIONS

Japan Patent Office, JP2023-518478 First Office Action issued on Jun. 25, 2024.

(Continued)

*Primary Examiner* — Daniel A Hess
(74) *Attorney, Agent, or Firm* — Li & Cai Intellectual Property (USA) Office

(57) ABSTRACT

Provided is a data transmission method, relating to the field of communication technology. The method includes: reading, from a local on-chip storage device and based on a plurality of descriptors, data to be transmitted corresponding to the plurality of descriptors; and transmitting the data to be transmitted based on the plurality of descriptors, where the plurality of descriptors are configured to define a storage mode of the data to be transmitted in the local on-chip storage device, and an existence mode of the data to be transmitted on a transmission link during transmission of the data to be transmitted. Also provided are a data processing method, a distributed unit and a computer-readable storage medium.

20 Claims, 13 Drawing Sheets

(56) References Cited

FOREIGN PATENT DOCUMENTS

| JP | 2010088000 A | 4/2010 |
|----|--------------|--------|
| JP | 2017517970 A | 6/2017 |
| JP | 2018049362 A | 3/2018 |
| JP | 2018049363 A | 3/2018 |
| JP | 2019053591 A | 4/2019 |
| JP | 2020149526 A | 9/2020 |

OTHER PUBLICATIONS

European Patent Office, the Extended Search Report dated Sep. 4, 2024, for corresponding EP application No. 21868505.5.
Japan Patent Office, Decision of Refusal dated Oct. 1, 2024, for corresponding JP application No. 2023-518478.

DATA TRANSMISSION METHOD AND DATA PROCESSING METHOD, DISTRIBUTED UNIT, RADIO UNIT, AND COMPUTER-READABLE STORAGE MEDIUM

CROSS-REFERENCE TO RELATED APPLICATIONS

The present disclosure is a National Phase Application filed under 35 U.S.C. 371 as a national stage of PCT/CN2021/116905, filed on Sep. 7, 2021, an application claiming the priority to Chinese patent application No. 202010994936.6 filed on Sep. 21, 2020 with the China Patent Office, the entire contents of which are incorporated by reference into the present disclosure.

TECHNICAL FIELD

Embodiments of the present disclosure relate to the field of communication technology.

BACKGROUND

In an Open Radio Access Net (O-RAN), base stations are divided into O-RAN Distributed Unit (O-DU) and O-RAN Radio Unit (O-RU). The O-RU is controlled by the O-DU and communicates with the O-DU via an optical fiber.

SUMMARY

As an aspect, an embodiment of the present disclosure provides a data transmission method, including: reading, from a local on-chip storage device and based on a plurality of descriptors, data to be transmitted corresponding to the plurality of descriptors; and transmitting the data to be transmitted based on the plurality of descriptors, where the plurality of descriptors are configured to define a storage mode of the data to be transmitted in the local on-chip storage device, and an existence mode of the data to be transmitted on a transmission link during transmission of the data to be transmitted.

As another aspect, an embodiment of the present disclosure provides a data processing method, including: generating a plurality of descriptors based on received control data, where the plurality of descriptors correspond to data to be transmitted corresponding to the control data; and writing the data to be transmitted into a local on-chip storage device based on the plurality of descriptors, where the plurality of descriptors are configured to define a storage mode of the data to be transmitted in the local on-chip storage device, and an existence mode of the data to be transmitted on a transmission link during transmission of the data to be transmitted.

As yet another aspect, an embodiment of the present disclosure provides a distributed unit including: at least one processor; and a storage on which at least one program is stored which, when executed by the at least one processor, causes the at least one processor to implement the data transmission method provided by any of the embodiments of the present disclosure.

As yet another aspect, an embodiment of the present disclosure provides a radio unit including: at least one processor; and a storage on which at least one program is stored which, when executed by the at least one processor, causes the at least one processor to implement the data processing method provided by any of the embodiments of the present disclosure.

As yet another aspect, an embodiment of the present disclosure provides a computer-readable storage medium having a computer program stored thereon which, when executed by a processor, causes the processor to implement at least one of the following methods: the data transmission method provided by any of the embodiments of the present disclosure; or the data processing method provided by any of the embodiments of the present disclosure.

BRIEF DESCRIPTION OF DRAWINGS

FIG. 1 (*b*) is a schematic diagram illustrating a communication process between an O-DU and an O-RU.

DETAIL DESCRIPTION OF EMBODIMENTS

In order to make those skilled in the art better understand the technical solutions of the present disclosure, the data transmission method, the data processing method, the distributed unit, the radio unit, and the computer-readable storage medium provided in the present disclosure are described in detail below with reference to the accompanying drawings.

Exemplary embodiments will be described more fully hereinafter with reference to the accompanying drawings, but which may be embodied in different forms and should not be construed as limited to the embodiments set forth herein. Rather, these embodiments are provided so that this disclosure will be thorough and complete, and will fully convey the scope of the present disclosure to those skilled in the art.

Implementations of the present disclosure and features of implementations may be combined with each other without conflict.

As used herein, the term "and/or" includes any and all combinations of at least one of the associated listed items.

The terminology used herein is for the purpose of describing particular embodiments only and is not intended to limit the present disclosure. As used herein, the singular forms "a", "an" and "the" are intended to include the plural forms as well, unless the context clearly indicates otherwise. It will be further understood that the terms "include" and/or "including" when used in this specification, specify the presence of stated features, integers, operations, operations, elements, and/or components, but do not preclude the presence or addition of one or more other features, integers, operations, operations, elements, components, and/or combinations thereof.

Unless otherwise defined, all terms (including technical and scientific terms) used herein have the same meaning as commonly understood by one of ordinary skill in the art. It will be further understood that terms, such as those defined in commonly used dictionaries, should be interpreted as having a meaning that is consistent with their meaning in the context of the relevant art and the present disclosure, and will not be interpreted in an idealized or overly formal sense unless expressly so defined herein.

Figure 1:
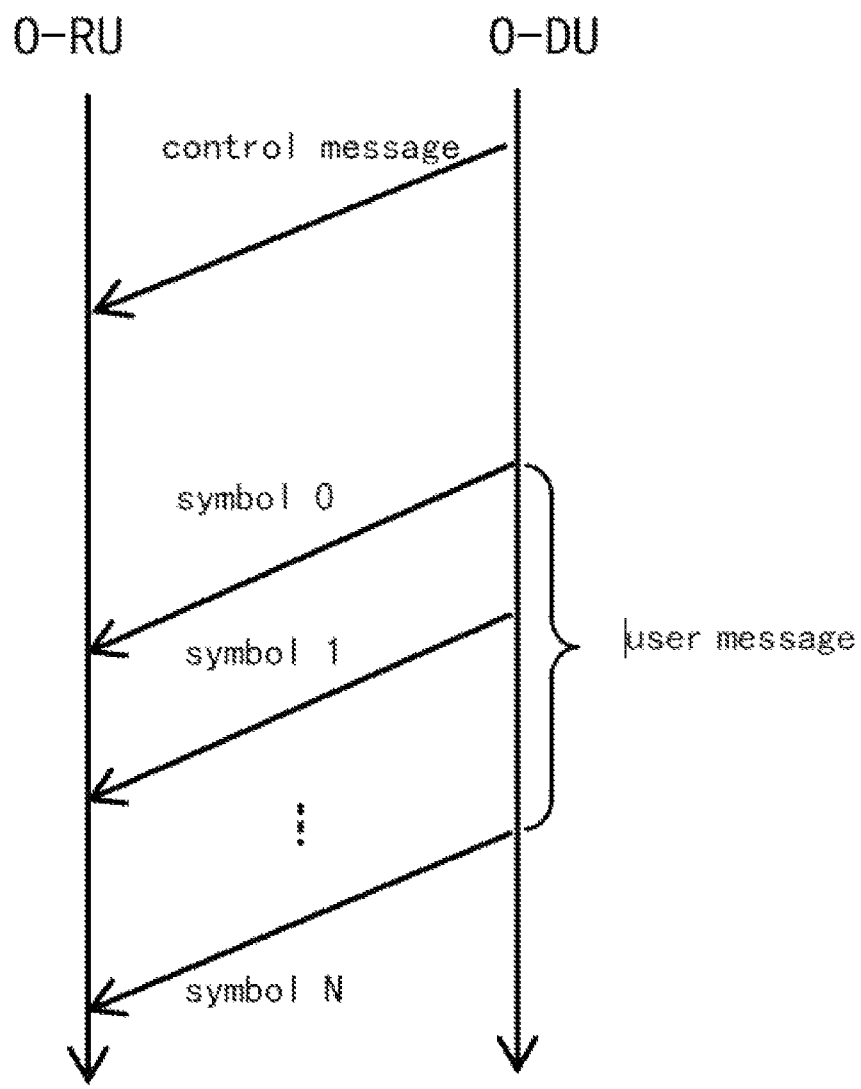
FIG. 1 (*a*) is a schematic diagram illustrating a communication process between an O-DU and an O-RU.
Figure 1:
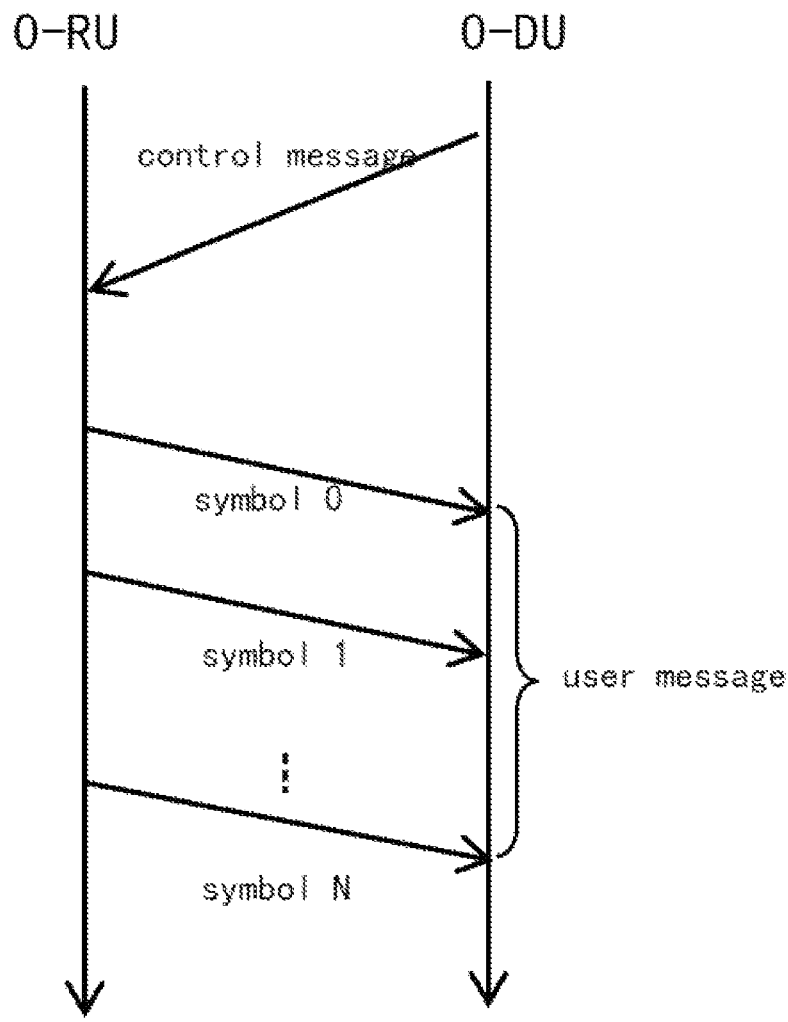

FIG. 1 (*a*) and FIG. 1 (*b*) are signaling diagrams illustrating communication processes between an O-DU and an O-RU. As shown in FIG. 1 (*a*), in the downlink, the O-DU transmits control data (control message) to the O-RU, and the O-RU receives user data (user message) transmitted from the O-DU based on the received control data. As shown in FIG. 1 (*b*), in the uplink, the O-DU transmits control data (control message) to the O-RU, and the O-RU transmits user data (control message) to the O-DU based on the received control data.

However, it has found that, in the communication processes between the O-DU and the O-RU as shown in FIGS. 1 (*a*) and 1 (*b*), in order to improve the system throughput and save cache resources of the system, a general-purpose processor or an accelerator is desired to pre-cache the to-be-transmitted control data or user data such as symbol 0, symbol 1, . . . , symbol N in an on-chip storage device on the O-DU side or the O-RU side, and therefore, the bus is occupied for a longer time due to a higher frequency of accessing the on-chip storage device by the general-purpose processor or the accelerator, which results in lower data read/write efficiency in the communication processes between the O-DU and the O-RU.

In view of above, embodiments of the present disclosure aim to provide a Direct Memory Access (DMA) method for an O-RAN fronthaul. It should be noted that DMA refers to an interface technology in which an external device directly exchanges data with a system memory without passing through a Central Processing Unit (CPU).

Figure 2:
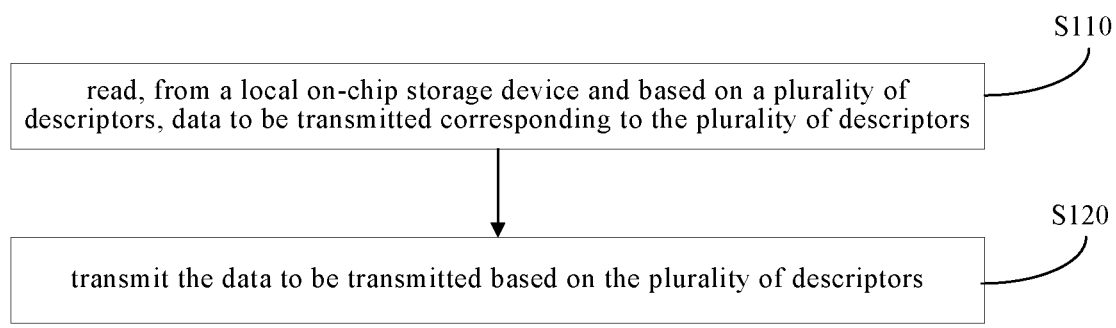
FIG. 2 is a flowchart illustrating a data transmission method according to the present disclosure.

As a first aspect, referring to FIG. 2, the present disclosure provides a data transmission method, which includes operations S110 and S120.

In operation S110, data to be transmitted corresponding to a plurality of descriptors is read from a local on-chip storage device based on the plurality of descriptors.

In operation S120, the data to be transmitted is transmitted based on the plurality of descriptors.

The descriptors are configured to define a storage mode of the data to be transmitted in the local on-chip storage device, and an existence mode of the data to be transmitted on a transmission link during transmission of the data to be transmitted.

In the present disclosure, the descriptors are intermediate parameters in the O-DU for transmitting data in the on-chip storage device. The descriptors correspond to the data to be transmitted, and each of the descriptors defines a size, content, storage mode and the like of data to be transmitted corresponding to the descriptor. The hardware logic can determine, by parsing the descriptor, a storage position of the data to be transmitted corresponding to the descriptor in the on-chip storage device, and therefore the to-be-transmitted user data corresponding to the descriptor can be read from the on-chip storage device, and thus the DMA is achieved. The descriptor also defines the existence mode of the data to be transmitted on the link between the O-DU and the O-RU, and the hardware logic can transmit, by parsing the descriptor, the data to be transmitted through the link.

It should be noted that, regarding the links between the O-DU and the O-RU in the present disclosure, a link along a direction from the O-DU to the O-RU is a downlink, and a link along a direction from the O-RU to the O-DU is an uplink.

In the present disclosure, how to construct the descriptor is not particularly limited. As an alternative implementation, the descriptor may be planned and constructed by a user based on an actual situation of the system.

In the present disclosure, the data to be transmitted may be control data for controlling the operation of the O-RU, may also be user data, and may also be time information (sync message) for system synchronization. The to-be-transmitted user data can be downlink user data, i.e., user data transmitted to the O-RU by the O-DU; or may be uplink user data, i.e., user data transmitted to the O-DU by the O-RU.

It should be noted that, in a case where the data to be transmitted is user data, the operation S120 of transmitting the data to be transmitted may include transmitting the user data to the O-RU via the downlink, or receiving the user data transmitted by the O-RU via the uplink.

In the data transmission method provided by the present disclosure, by configuring the descriptor, the hardware logic can directly access the on-chip storage device, to read and transmit the data to be transmitted from the on-chip storage device. The frequency of direct interaction between the general-purpose processor or the accelerator and the on-chip storage device is reduced in the process of communication between the O-DU and the O-RU, thereby reducing the occupation time of the bus and improving the data read/write efficiency. The descriptor also defines the storage mode of the data to be transmitted in the on-chip storage device, so that the utilization rate and the flexibility of the on-chip storage device can be improved. The descriptor in the present disclosure can be configured by a user, so that the flexibility and the expandability of the access to the on-chip storage device in the process of communication between the O-DU and the O-RU are further improved.

In the present disclosure, the descriptor is embodied as a set of at least one parameter configured by a software layer. The parameter included in the descriptor includes a parameter defining the storage mode of the data to be transmitted in the on-chip storage device, the hardware logic determines storage position information of the data to be transmitted corresponding to the descriptor in the on-chip storage device by parsing the parameter in the descriptor, which defines the storage mode of the data to be transmitted in the on-chip storage device, and then the data to be transmitted corresponding to the descriptor is read from the on-chip storage device through operation S110.

In the present disclosure, the correspondence mode between the plurality of descriptors and the data to be transmitted is not particularly limited. As an alternative implementation, the data to be transmitted by the O-DU is fragmented into a plurality of data fragments, and each descriptor corresponds to a respective one data fragment. Each descriptor defines information such as the storage mode of the corresponding data fragment in the on-chip storage device and the existence mode of the corresponding data fragment on the link. The data to be transmitted is stored in fragments in the on-chip storage device, and the flexibility of data storage and access in the on-chip storage device can be further improved. Further, in the parameter in the descriptor, which defines the storage mode of the data to be transmitted in the on-chip storage device, the storage information of the data fragment corresponding to the descriptor in the on-chip storage device is configured.

Accordingly, as an alternative implementation, the data to be transmitted includes a plurality of data fragments, each descriptor corresponds to a respective one data fragment, the descriptor includes a data address parameter, and data storage information of the data fragment corresponding to the descriptor in the on-chip storage device is configured in the data address parameter.

Figure 3:
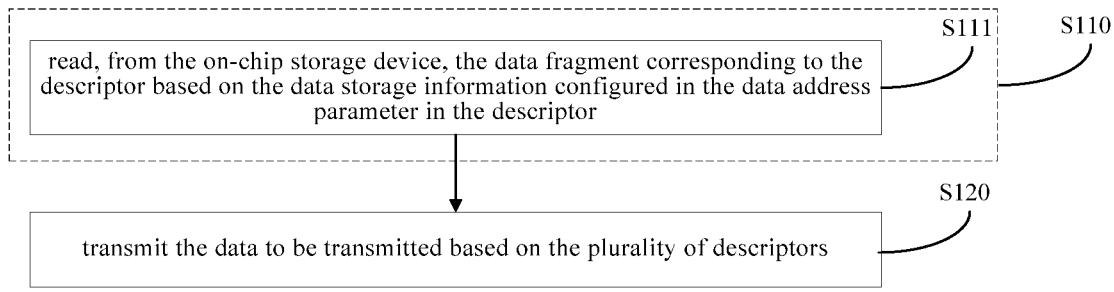
FIG. 3 is a flowchart illustrating some operations of a data transmission method according to the present disclosure.

Referring to FIG. 3, operation S110 includes operation S111. In operation S111, the data fragment corresponding to the descriptor is read from the on-chip storage device based on the data storage information configured in the data address parameter in the descriptor.

In the present disclosure, contents of the data storage information are not particularly limited. For example, the data storage information may include a start address of a storage space in the on-chip storage device for storing the data fragment corresponding to the descriptor, a size of the storage space, and the like.

In the present disclosure, how to fragment the data to be transmitted to obtain the plurality of data fragments is not particularly limited. For example, the data that needs to be transmitted by the O-DU within a certain time may be regarded as one data fragment; the data that needs to be transmitted by the O-DU within a certain time may also be divided into a plurality of data fragments in unit of symbol, for example, one symbol is one data fragment, or multiple symbols are included in one data fragment.

As an alternative implementation, the data to be transmitted by the O-DU is fragmented by a general-purpose processor or an accelerator and stored into the on-chip storage device in fragments.

In the present disclosure, the parameter included in the descriptor further includes a parameter defining the existence mode of data to be transmitted on the link. The hardware logic transmits the read data to be transmitted through operation S120 by parsing the parameter that defines the existence mode of the data to be transmitted on the link in the descriptor. Further, existence mode information of the data fragment corresponding to the descriptor on the link is configured in the parameter that defines the existence mode of the data to be transmitted on the link in the descriptor. As an alternative implementation, the existence mode information of the data fragment on the link includes, but is not limited to, frame format information, time domain information, and frequency domain information.

Accordingly, as an alternative implementation, the descriptor further includes a frame format parameter, a time domain parameter, and a frequency domain parameter. The frame format information of the data fragment corresponding to the descriptor is configured in the frame format parameter, the time domain information of the data fragment corresponding to the descriptor is configured in the time domain parameter, and the frequency domain information of the data fragment corresponding to the descriptor is configured in the frequency domain parameter.

Figure 4:
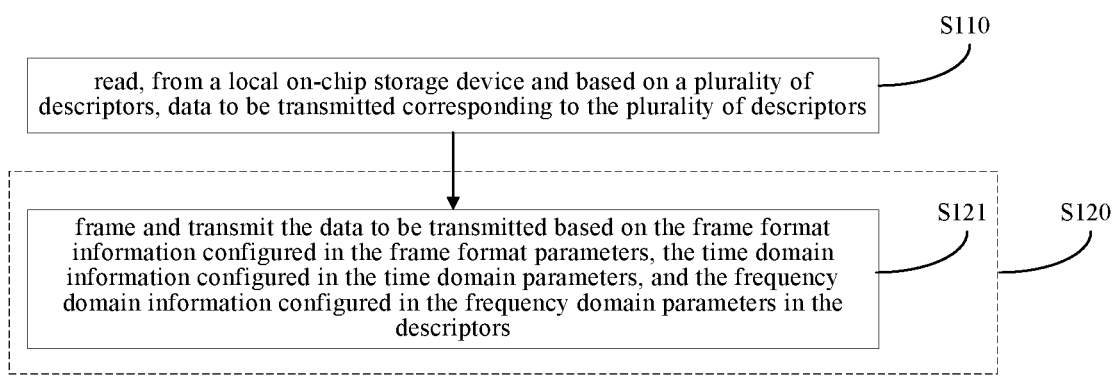
FIG. 4 is a flowchart illustrating some operations of a data transmission method according to the present disclosure.

Referring to FIG. 4, operation S120 includes operation S121. In operation S121, the data to be transmitted is framed based on the frame format information configured in the frame format parameters, the time domain information configured in the time domain parameters, and the frequency domain information configured in the frequency domain parameters in the descriptors.

In the present disclosure, the content of the frame format information is not particularly limited, and for example, the frame format information may include a frame type, a frame length, and the like. The content of the frequency domain information is also not particularly limited the present disclosure, and for example, the frequency domain information may include a Physical Resource Block (PRB) number. The content of the time domain information is also not particularly limited in the present disclosure, and for example, the time domain information includes a 10 ms frame number, a 1 ms subframe number, link latency information, and the like.

In the present disclosure, the descriptors are also stored in the on-chip storage device. The hardware logic can directly access the on-chip storage device, read the descriptors, and then read and transmit the data to be transmitted stored in the on-chip storage device through operations S110 to S120 based on the descriptors.

Figure 5:
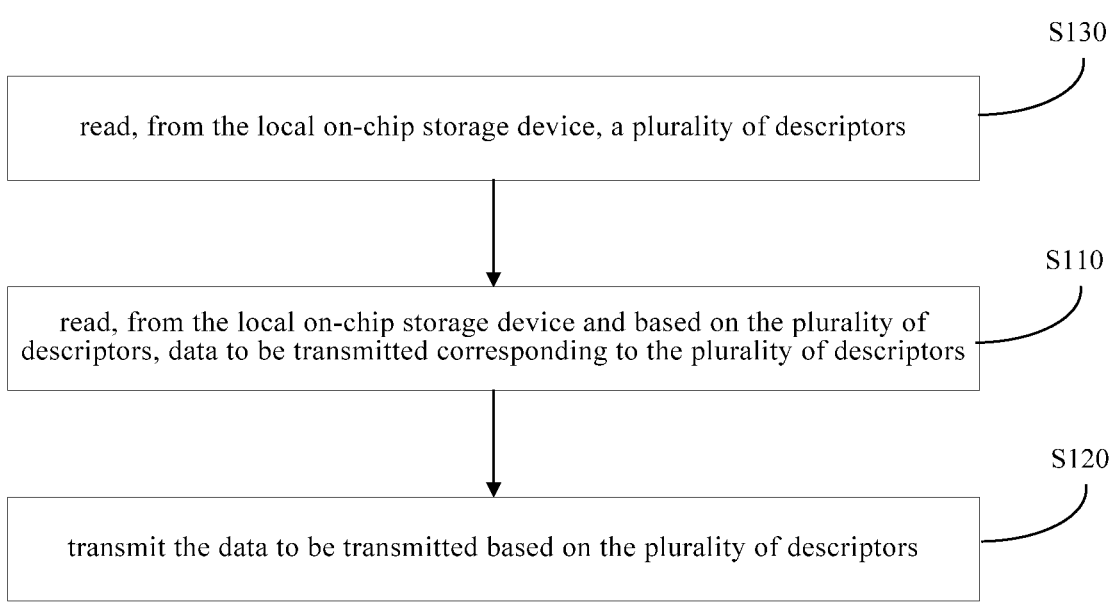
FIG. 5 is a flowchart illustrating some operations of a data transmission method according to the present disclosure.

Accordingly, referring to FIG. 5, as an alternative implementation, before operation S110, the data transmission method further includes operation S130.

In operation S130, the plurality of descriptors are read from the on-chip storage device.

The present disclosure does not particularly limit how to perform operation S130. As an alternative implementation, the hardware logic periodically reads the descriptors from the on-chip storage device based on the storage location information of the descriptors in the on-chip storage device.

Figure 6:
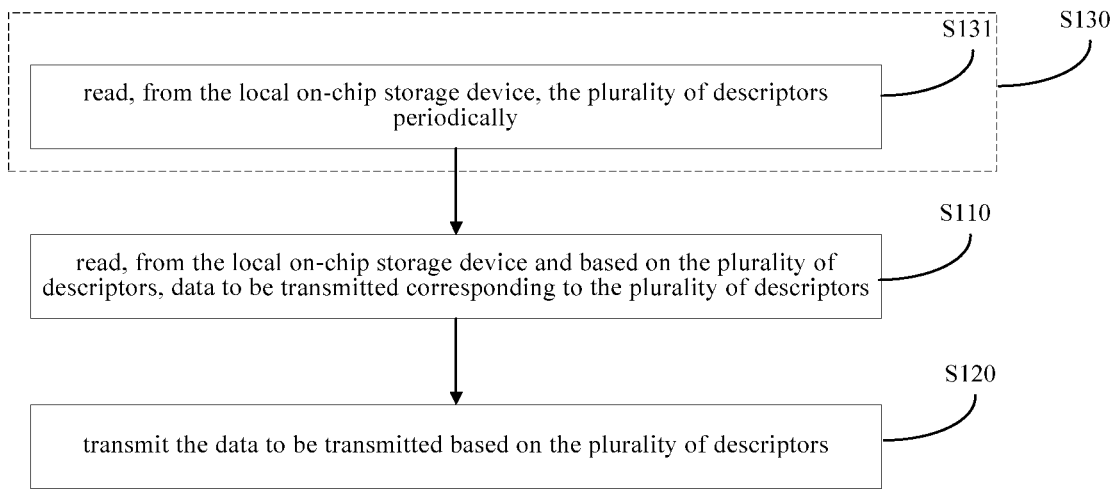
FIG. 6 is a flowchart illustrating some operations of a data transmission method according to the present disclosure.

Accordingly, referring to FIG. 6, as an alternative implementation, operation S130 includes operation S131. In operation S131, the plurality of descriptors are periodically read from the on-chip storage device.

The present disclosure does not particularly limit the storage mode of the descriptors in the on-chip storage device. As an alternative implementation, the descriptors may be stored discretely in the on-chip storage device. For example, the storage address of a next descriptor is used as one of the parameters of the current descriptor, so as to realize the chain storage of the descriptors, and the hardware logic obtains the storage location of the next descriptor by parsing the parameters in the current descriptor, thereby completing the reading and writing of all descriptors.

Figure 7:
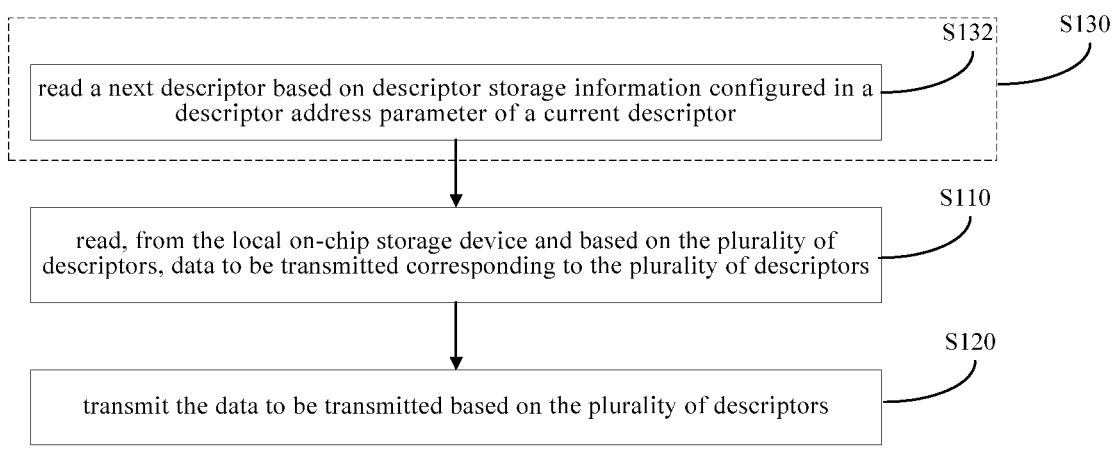
FIG. 7 is a flowchart illustrating some operations of a data transmission method according to the present disclosure.

Accordingly, as an alternative implementation, the descriptor further includes a descriptor address parameter, where descriptor storage information is configured in the descriptor address parameter of the current descriptor, and the descriptor storage information is used for characterizing storage information of a next descriptor of the current descriptor in the on-chip storage device. Referring to FIG. 7, operation S130 includes operation S132.

In operation S132, the next descriptor is read based on the descriptor storage information configured in the descriptor address parameter of the current descriptor.

It should be noted that, in the present disclosure, if the current descriptor is the last descriptor, the descriptor address parameter of the current descriptor may be null, that is, the descriptor storage information is not configured; alternatively, the descriptor storage information of the first descriptor may be configured in the descriptor address parameter of the last descriptor, thereby realizing circular chain storage. However, the present disclosure is not particularly limited thereto.

It should be further noted that, in the present disclosure, the descriptor storage information includes, but is not limited to, a start address of a storage space in the on-chip storage device for storing the descriptor, a size of the storage space, and other information.

As another alternative implementation, the descriptors may be stored contiguously in the on-chip storage device. For example, an address space is planned in advance as a dedicated storage space for the descriptors, the address of each parameter of the descriptor is fixed and known, and the general-purpose processor, accelerator, hardware logic, or the like reads/writes the descriptors circularly in the storage space.

Figure 8:
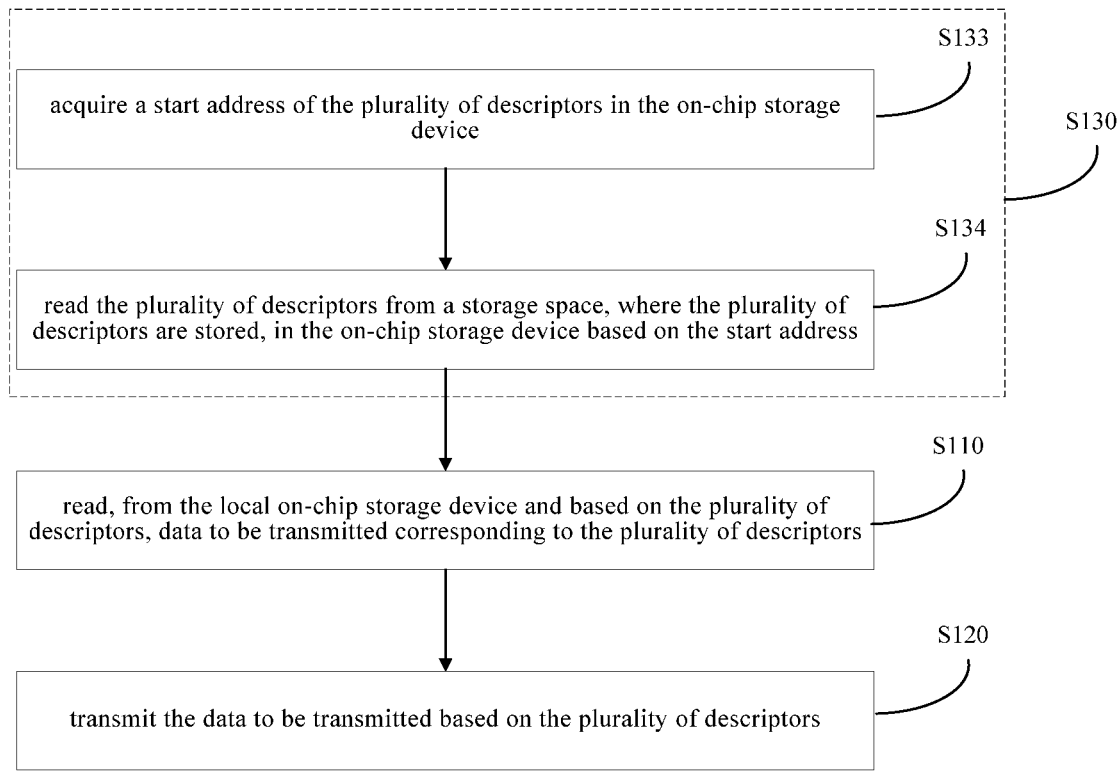
FIG. 8 is a flowchart illustrating some operations of a data transmission method according to the present disclosure.

Accordingly, referring to FIG. 8, as an alternative implementation, operation S130 includes operations S133 and S134.

In operation S133, a start address of the plurality of descriptors in the on-chip storage device is acquired.

In operation S134, the plurality of descriptors are read from the storage space, where the plurality of descriptors are stored, in the on-chip storage device based on the start address.

In the present disclosure, the storage space in the on-chip storage device for storing the plurality of descriptors is a continuous address space. As an alternative implementation, the start address of the plurality of descriptors in the on-chip storage device is default. Starting from the first descriptor, the hardware logic cyclically reads the plurality of descriptors based on the default start address.

In the present disclosure, the descriptor may be configured by a general-purpose processor or an accelerator, and may also be configured by a hardware logic. However, the embodiment of the present disclosure is not particularly limited thereto.

Figure 9:
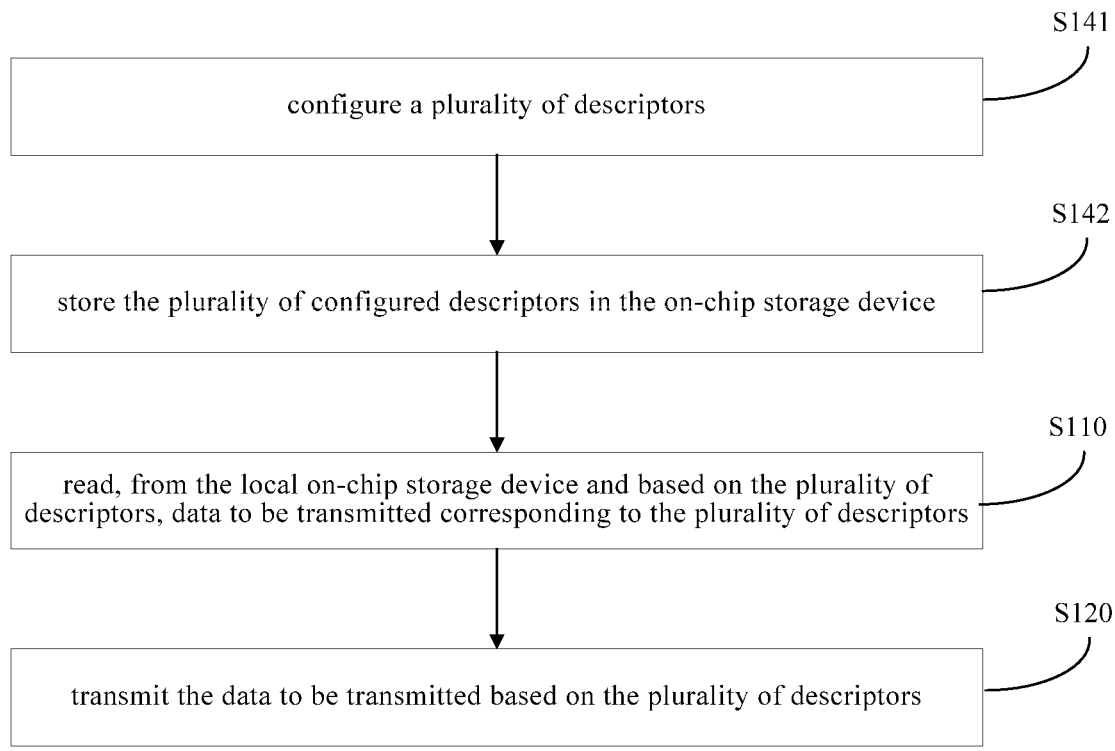
FIG. 9 is a flowchart illustrating some operations of a data transmission method according to the present disclosure.

Accordingly, referring to FIG. 9, as an alternative implementation, before operation S110, the data transmission method further includes operations S141 and S142.

In operation S141, a plurality of descriptors are configured.

In operation S142, the plurality of configured descriptors are stored in the on-chip storage device.

It should be noted that, in the present disclosure, the descriptor is configured, that is, data storage information of a data fragment corresponding to the descriptor in the on-chip storage device is configured in a data address parameter in the descriptor, frame format information of the data fragment corresponding to the descriptor is configured in a frame format parameter, time domain information of the data fragment corresponding to the descriptor is configured in a time domain parameter, frequency domain information of the data fragment corresponding to the descriptor is configured in a frequency domain parameter, descriptor storage information of a next descriptor in the on-chip storage device is configured in a descriptor address parameter, and corresponding information is configured in other parameters.

In the present disclosure, there is no particular limitation on how the descriptor is configured. As an alternative implementation, the descriptor may be planned and configured by a user based on an actual condition of the system, so that the flexibility and the expandability of the access to the on-chip storage device in the process of communication between the O-DU and the O-RU are improved.

It should be noted that, in the present disclosure, the descriptor is configured, that is, the number, the type, and the like of parameters, such as the data address parameter, the frame format parameter, the time domain parameter, the frequency domain parameter and the descriptor address parameter, in the descriptor are determined.

Figure 10:
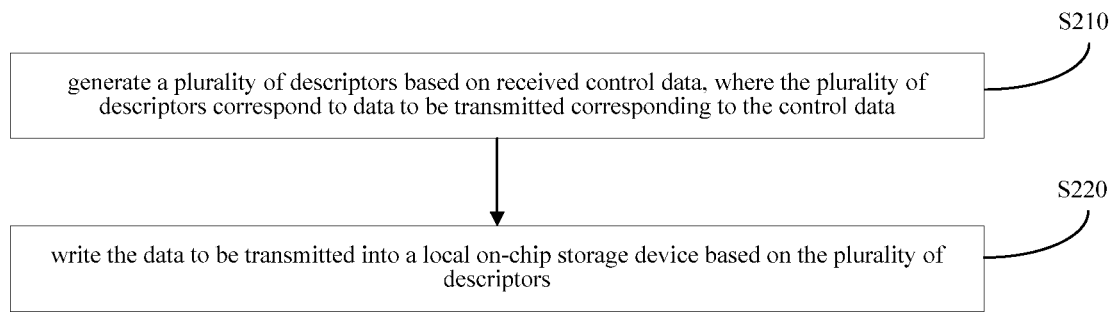
FIG. 10 is a flowchart illustrating a data processing method according to the present disclosure.

As a second aspect, referring to FIG. 10, the present disclosure provides a data processing method, including operations S210 and S220.

In operation S210, a plurality of descriptors are generated based on received control data, where the plurality of descriptors correspond to data to be transmitted corresponding to the control data.

In operation S220, the data to be transmitted is written into a local on-chip storage device based on the plurality of descriptors.

The descriptors are configured to define a storage mode of the data to be transmitted in the on-chip storage device and an existence mode of the data to be transmitted on a transmission link during transmission of the data to be transmitted.

In the present disclosure, the descriptors are intermediate parameters in the O-RU for transmitting data in the on-chip storage device. The descriptors correspond to the data to be transmitted, and each of the descriptors defines a size, content, storage mode and the like of data to be transmitted corresponding to the descriptor. The hardware logic can determine, by parsing the descriptor, a storage position of the data to be transmitted corresponding to the descriptor in the on-chip storage device, to write the data to be transmitted into the on-chip storage device, and to-be-transmitted user data corresponding to the descriptor can be read from the on-chip storage device, and thus the DMA is achieved. The descriptor also defines the existence mode of the data to be transmitted on the link between the O-DU and the O-RU, and the hardware logic can transmit, by parsing the descriptor, the data to be transmitted through the link. The O-RU side completes local data caching and framing by parsing the information sent by the O-DU side, and Remote Direct Memory Access (RDMA) is realized.

It should be noted that, regarding the links between the O-DU and the O-RU in the present disclosure, a link along a direction from the O-DU to the O-RU is a downlink, and a link along a direction from the O-RU to the O-DU is an uplink.

Control data, user data, time data, and the like are communicated between the O-DU and the O-RU. In the downlink, the O-DU transmits control data to the O-RU through a control channel, and after the O-RU is ready to receive new data, corresponding user data is sent in sequence; in the uplink, the O-DU transmits control data to the O-RU through a control channel, and the O-RU frames and transmits packets of user data to the O-DU based on the received control data. The control data defines frame structure information, frequency domain information, time domain information, and the like of the user data corresponding to the control data, and operation S210 is a process in which the hardware logic on the O-RU side maps the frame structure information, frequency domain information, time domain information, and the like defined in the control data into the descriptor after receiving the control data.

In the present disclosure, the data to be transmitted may be user data that is sent by the O-DU to the O-RU through a downlink, or user data that needs to be sent by the O-RU to the O-DU through an uplink, or other data. The present disclosure is not particularly limited thereto.

In the data processing method provided by the present disclosure, by configuring the descriptor based on the received control data, the hardware logic can directly access the on-chip storage device, and write the data to be transmitted into the on-chip storage device. The frequency of direct interaction between the general-purpose processor or the accelerator and the on-chip storage device is reduced in the process of communication between the O-DU and the O-RU, thereby reducing the occupation time of the bus and improving the data read/write efficiency. The descriptor also defines the storage mode of the data to be transmitted in the on-chip storage device, so that the utilization rate and the flexibility of the on-chip storage device can be improved. The descriptor in the present disclosure can be configured by a user, so that the flexibility and the expandability of the access to the on-chip storage device in the process of communication between the O-DU and the O-RU are further improved.

In the present disclosure, the descriptor is embodied as a set of at least one parameter configured by a software layer. The parameter included in the descriptor includes a parameter defining the storage mode of the data to be transmitted in the on-chip storage device. In operation S210, storage information of the data to be transmitted in the on-chip storage device is configured, based on the control data, in the parameter defining the storage mode of the data to be transmitted in the on-chip storage device in the descriptor, and then the data to be transmitted is written into the on-chip storage device through operation S220.

In the present disclosure, the correspondence mode between the plurality of descriptors and the data to be transmitted is not particularly limited. As an alternative implementation, the data to be transmitted is fragmented into a plurality of data fragments, and each descriptor corresponds to a respective one data fragment. Each descriptor defines information such as the storage mode of the corresponding data fragment in the on-chip storage device and the existence mode of the corresponding data fragment on the link. The data to be transmitted is stored in fragments in the on-chip storage device, and the flexibility of data storage and access in the on-chip storage device can be further improved. Further, in the process of generating the descriptor in operation S210, the storage information of the data fragment corresponding to the descriptor in the on-chip storage device is configured in the parameter that defines the storage mode of the data to be transmitted in the on-chip storage device in the descriptor.

Figure 11:
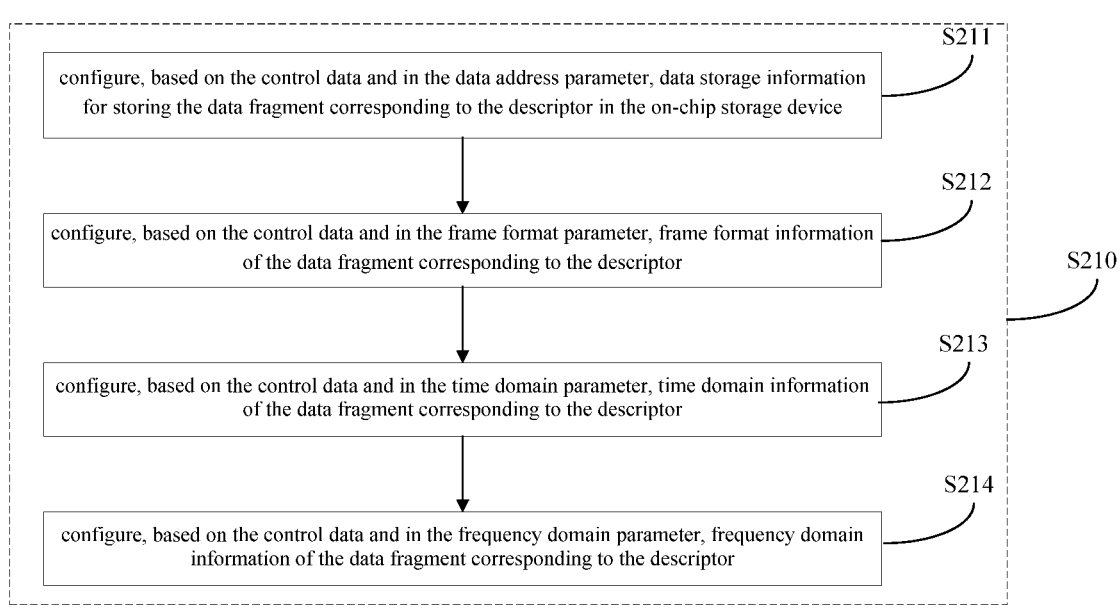
FIG. 11 is a flowchart illustrating some operations of a data processing method according to the present disclosure.

Accordingly, as an alternative implementation, the data to be transmitted includes a plurality of data fragments, each descriptor corresponds to a respective one data fragment, and the descriptor includes a data address parameter, referring to FIG. 11, operation S210 includes operation S211.

In operation S211, data storage information for storing the data fragment corresponding to the descriptor in the on-chip storage device is configured in the data address parameter based on the control data.

In the present disclosure, contents of the data storage information are not particularly limited. For example, the data storage information may include a start address of a storage space in the on-chip storage device for storing the data fragment corresponding to the descriptor, a size of the storage space, and the like.

In the present disclosure, in a case where the data to be transmitted is user data, the data to be transmitted may be user data sent from the O-DU to the O-RU via a downlink, or user data that needs to be sent from the O-RU to the O-DU via an uplink.

In the present disclosure, the parameter included in the descriptor further includes a parameter defining the existence mode of data to be transmitted on the link. The hardware logic determines the existence mode of the data to be transmitted on the downlink by parsing the parameter defining the existence mode of the data to be transmitted on the link in the descriptor to establish the mapping relation between the user data which is sent from the O-DU to the O-RU and the descriptor; or determines the existence mode of the data to be transmitted on the uplink to establish the mapping relation between the user data, which needs to be sent via the uplink to the O-DU from the O-RU, and the descriptor. Further, in the process of generating the descriptor in operation S210, the existence mode information of the data fragment corresponding to the descriptor on the link is configured in the parameter that defines the existence mode of the data to be transmitted on the link in the descriptor. As an alternative implementation, the existence mode information of the data fragment on the link includes, but is not limited to, frame format information, time domain information, and frequency domain information.

Accordingly, as an alternative implementation, the descriptor further includes a frame format parameter, a time domain parameter, and a frequency domain parameter, and referring to FIG. 11, operation S210 further includes operations S212 to S214.

In operation S212, frame format information of the data fragment corresponding to the descriptor is configured in the frame format parameter based on the control data.

In operation S213, time domain information of the data fragment corresponding to the descriptor is configured in the time domain parameter based on the control data.

In operation S214, frequency domain information of the data fragment corresponding to the descriptor is configured in the frequency domain parameter based on the control data.

In the present disclosure, in a case where the data to be transmitted is uplink data to be transmitted, the storage information of the uplink data to be transmitted in the on-chip storage device is configured in the descriptor generated in operation S210, the size of each data fragment can be determined based on the storage information, when the uplink data to be transmitted is stored in fragments in the on-chip storage device. As an alternative implementation, the uplink data to be transmitted is fragmented based on the descriptor, to obtain a data fragment corresponding to the descriptor. And then writes the respective data fragments to the on-chip storage device through operation S220.

Figure 12:
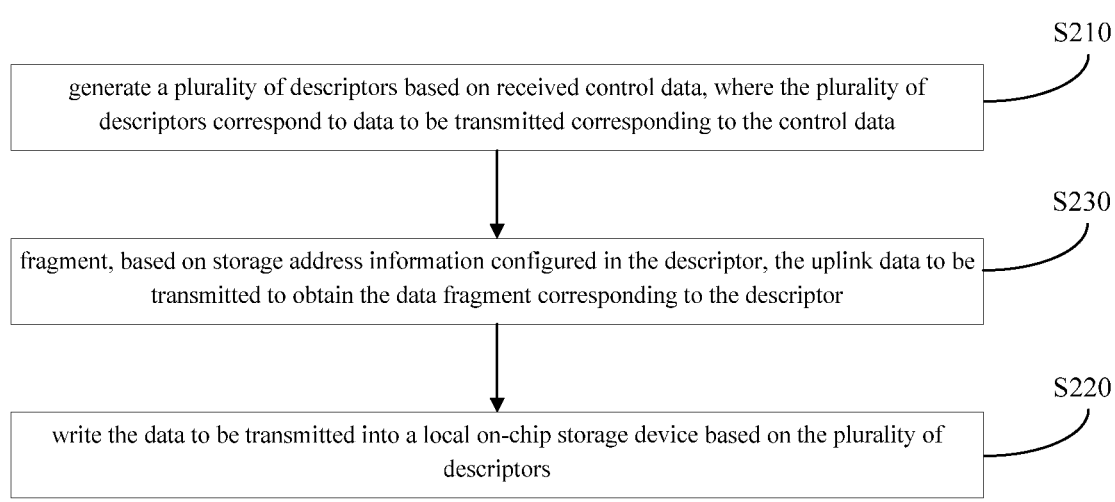
FIG. 12 is a flowchart illustrating some operations of a data processing method according to the present disclosure.

Accordingly, as an alternative implementation, the data to be transmitted includes uplink data to be transmitted, and referring to FIG. 12, before operation S220, the data processing method further includes operation S230.

In operation S230, the uplink data to be transmitted is fragmented based on the storage address information configured in the descriptor, to obtain a data fragment corresponding to the descriptor.

In the present disclosure, in a case where the data to be transmitted is downlink data to be transmitted, information of the downlink data to be transmitted, which indicates the existence mode of the downlink data to be transmitted on the downlink, is configured in the descriptor generated in operation S210, and a data fragment corresponding to the descriptor can be determined based on the information of the downlink data to be transmitted, which indicates the existence mode of the downlink data to be transmitted on the downlink and is configured in the descriptor.

Figure 13:
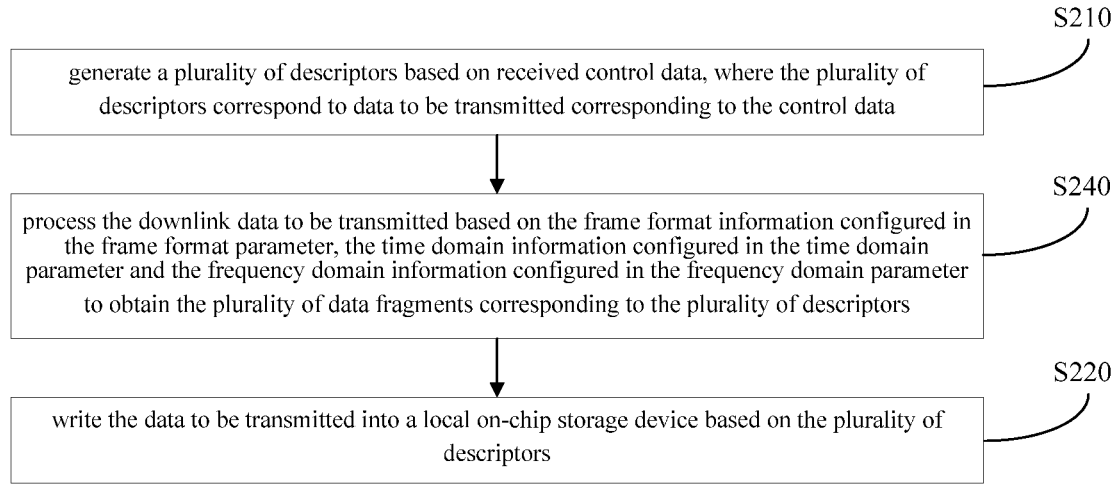
FIG. 13 is a flowchart illustrating some operations of a data processing method according to the present disclosure.

Accordingly, as an alternative implementation, the data to be transmitted includes downlink data to be transmitted, and referring to FIG. 13, before operation S220, the data processing method further includes operation S240.

In operation S240, the downlink data to be transmitted is processed based on the frame format information configured in the frame format parameter, the time domain information configured in the time domain parameter, and the frequency domain information configured in the frequency domain parameter, to obtain a plurality of data fragments corresponding to the descriptors.

In the present disclosure, after receiving the control data sent by the O-DU, the O-RU allocates a storage space for each data fragment, and in operation S210, address information of the storage space allocated for each data fragment is configured in a descriptor corresponding to the data fragment. When the data to be transmitted is written into the on-chip storage device in operation S220, the data fragment is written into the pre-allocated storage space based on the address information configured in the descriptor corresponding to the data fragment.

Figure 14:
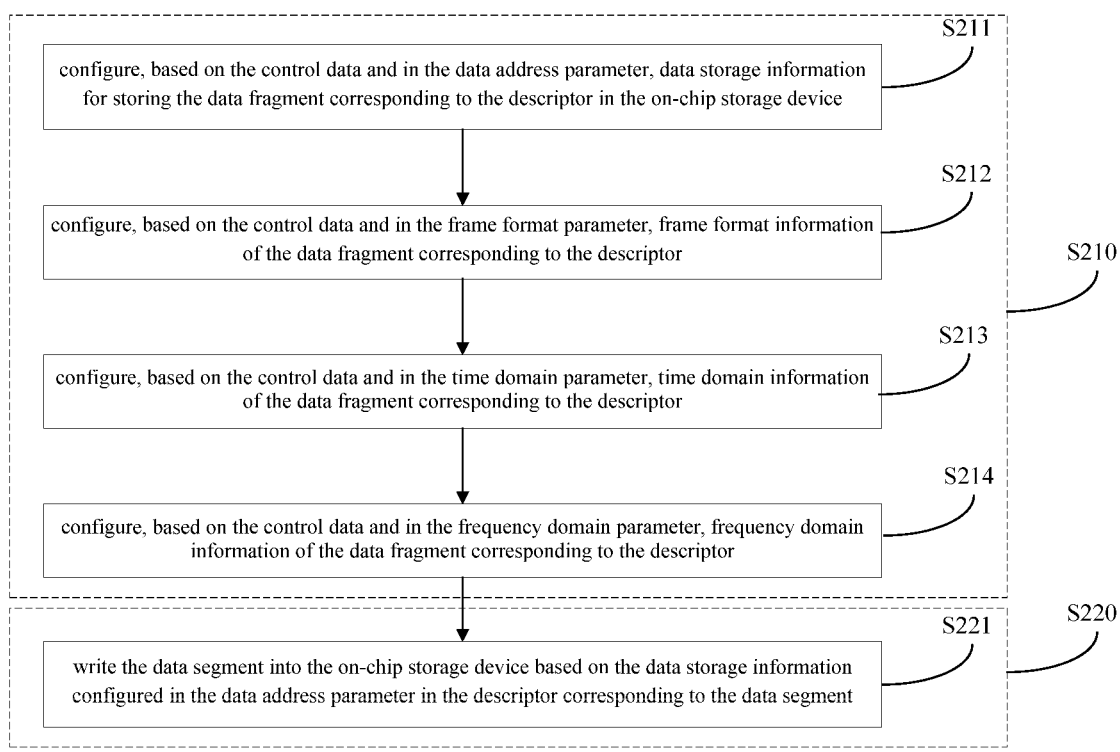
FIG. 14 is a flowchart illustrating some operations of a data processing method according to the present disclosure.

Accordingly, referring to FIG. 14, as an alternative implementation, operation S220 includes operation S221. In operation S221, the data fragment is written into the on-chip storage device based on the data storage information configured in the data address parameter in the descriptor corresponding to the data fragment.

In the present disclosure, the descriptor generated in operation S210 is also stored in the on-chip storage device. The present disclosure does not particularly limit the storage mode of the descriptor in the on-chip storage device. As an alternative implementation, the descriptors may be stored discretely in the on-chip storage device. For example, the storage address of a next descriptor is used as one of the parameters of the current descriptor, so as to realize the chain storage of the descriptors, and the hardware logic obtains the storage location of the next descriptor by parsing the parameters in the current descriptor, thereby completing the reading and writing of all descriptors.

Figure 15:
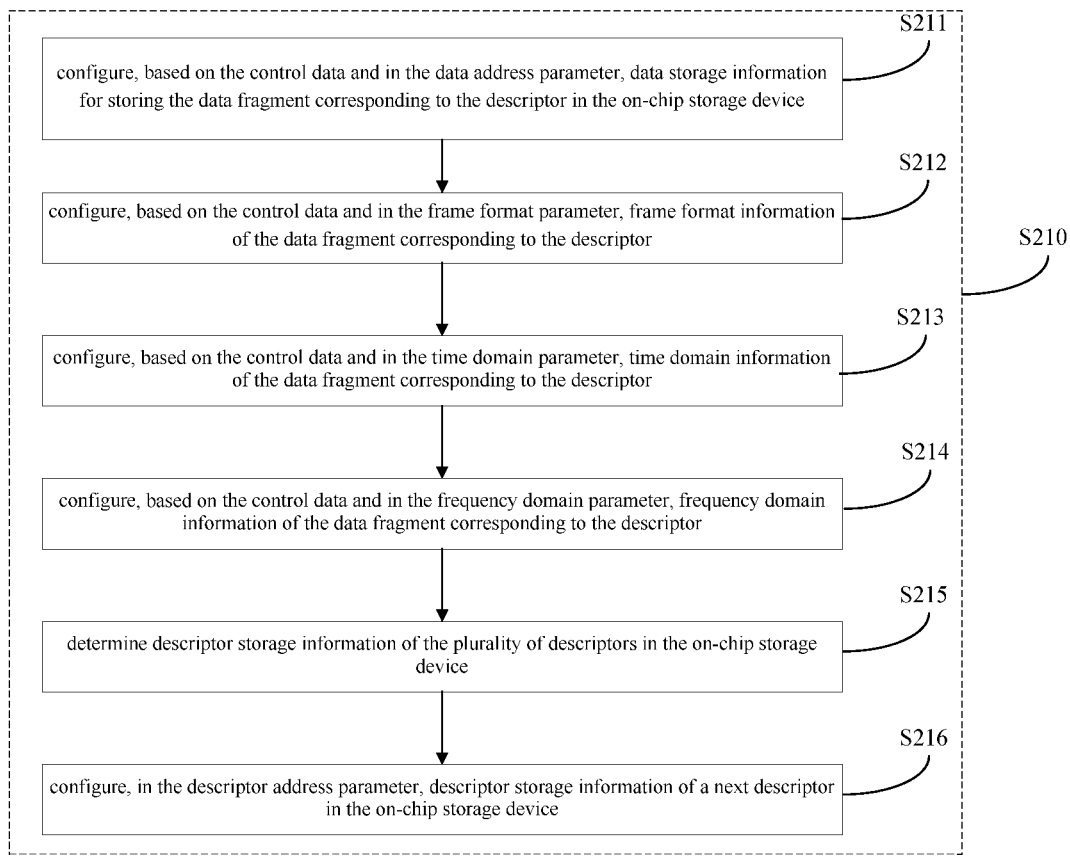
FIG. 15 is a flowchart illustrating some operations of a data processing method according to the present disclosure.

Accordingly, as an alternative implementation, the descriptor further includes a descriptor address parameter, and referring to FIG. 15, operation S210 further includes operations S215 and S216.

In operation S215, descriptor storage information of the plurality of descriptors in the on-chip storage device is determined.

In operation S216, descriptor storage information of the next descriptor in the on-chip storage device is configured in the descriptor address parameter.

In the present disclosure, after writing the data to be transmitted into the on-chip storage device, the O-RU further sends the user data, which is sent to the O-RU by the O-DU through a downlink, to a next-stage module; or sends the user data, which requires the O-RU to transmit to the O-DU through an uplink, to the O-DU.

Figure 16:
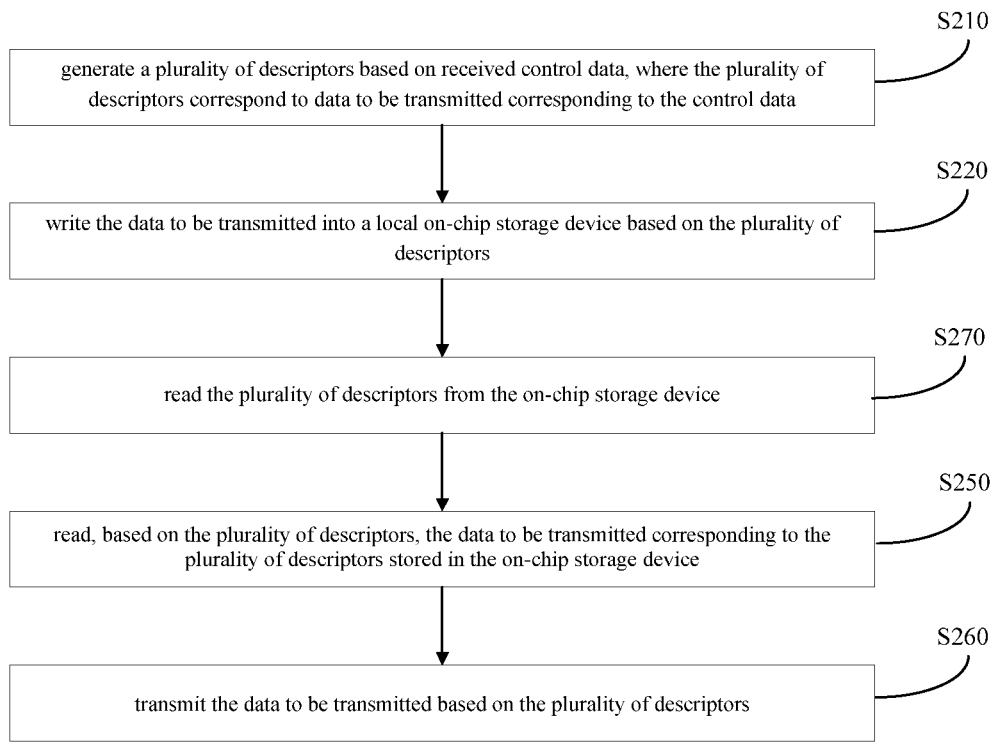
FIG. 16 is a flowchart illustrating some operations of a data processing method according to the present disclosure.

Accordingly, referring to FIG. 16, as an alternative implementation, the data processing method further includes operations S250 and S260.

In operation S250, the data to be transmitted corresponding to the plurality of descriptors stored in the on-chip storage device is read based on the plurality of descriptors.

In operation S260, the data to be transmitted is transmitted based on the plurality of descriptors.

In the present disclosure, when the data to be transmitted is uplink data to be transmitted, operation S260 includes: framing and sending the data to be transmitted to the O-DU based on the frame format information configured in the frame format parameter, the time domain information configured in the time domain parameter and the frequency domain information configured in the frequency domain parameter in each descriptor.

In a case where the data to be transmitted is downlink data to be transmitted, operation S260 includes: sending the data to be transmitted to a next-stage module.

Figure 17:
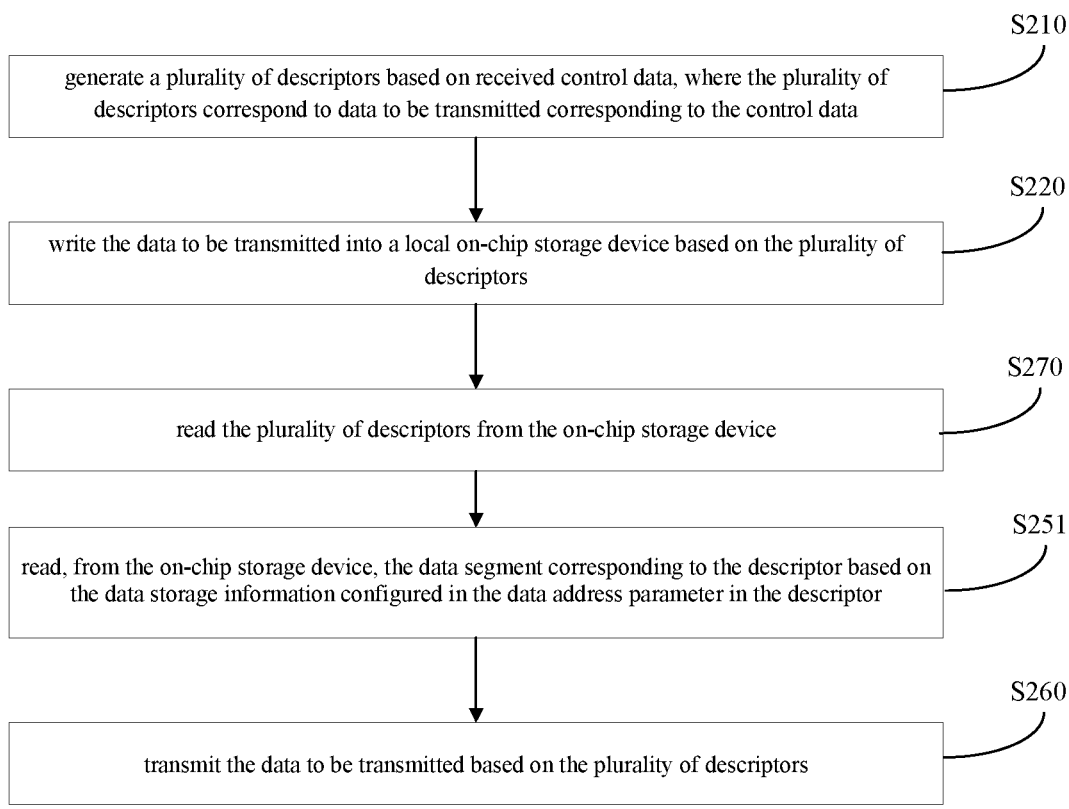
FIG. 17 is a flowchart illustrating some operations of a data processing method according to the present disclosure.

Accordingly, referring to FIG. 17, as an alternative implementation, operation S250 includes operation S251. In operation S251, the data fragment corresponding to the descriptor is read from the on-chip storage device based on the data storage information configured in the data address parameter in the descriptor.

In the present disclosure, the descriptors are also stored in the on-chip storage device. The hardware logic can directly access the on-chip storage device, read the descriptor, and then read and transmit the data to be transmitted stored in the on-chip storage device through operations S250 to S260 based on the descriptors.

Accordingly, referring to FIG. 16, as an alternative implementation, before operation S250, the data processing method further includes operation S270. In operation S270, the plurality of descriptors are read from the on-chip storage device.

The present disclosure does not particularly limit how to perform operation S270. As an alternative implementation, the hardware logic periodically reads the descriptor from the on-chip storage device based on the storage location information of the descriptors in the on-chip storage device.

Figure 18:
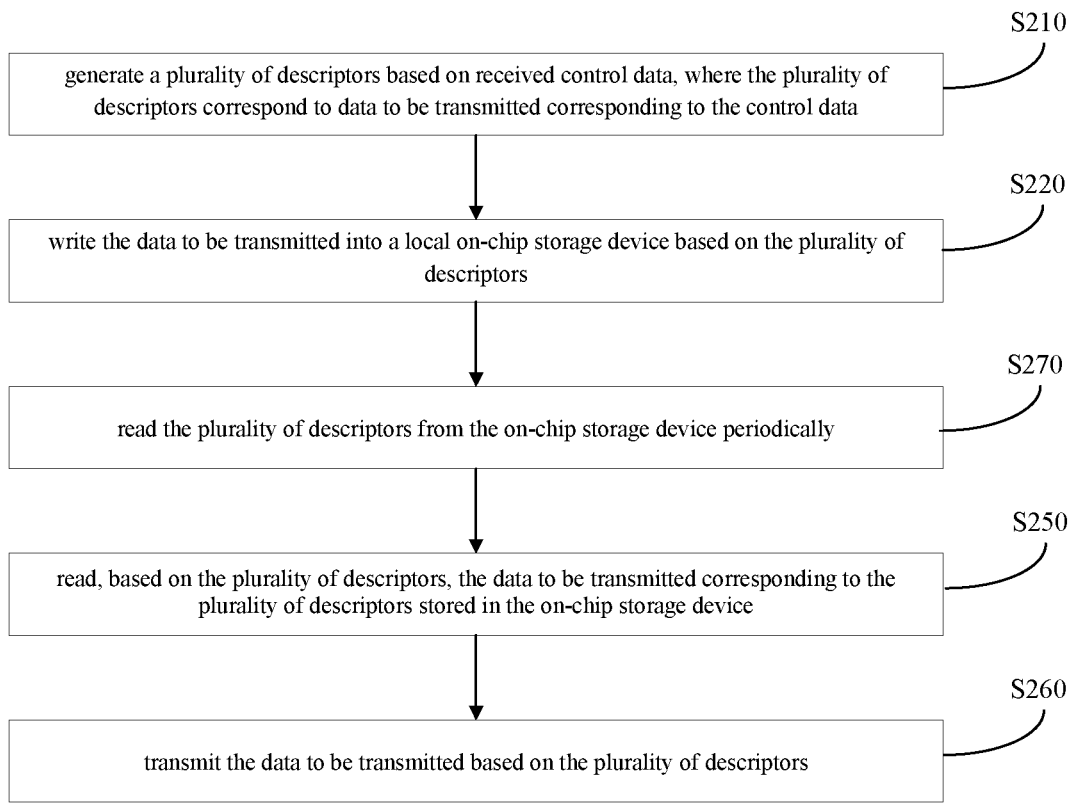
FIG. 18 is a flowchart illustrating some operations of a data processing method according to the present disclosure.

Accordingly, referring to FIG. 18, as an alternative implementation, in operation S270, a plurality of descriptors are periodically read from the on-chip storage device.

Figure 19:
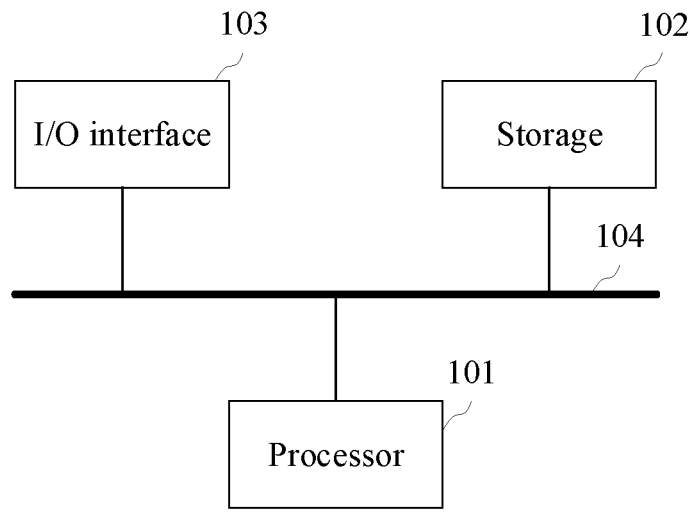
FIG. 19 is a block diagram illustrating a distributed unit according to the present disclosure.

In a third aspect, referring to FIG. 19, the present disclosure provides a distributed unit, including: at least one processors 101; a storage 102 on which at least one program is stored, which when executed by the at least one processor 101, causes the at least one processor 101 to implement the data transmission method provided by any of the embodiments of the present disclosure; and at least one Input/

Output (I/O) interface (read/write interface) 103 coupled between the processor 101 and the storage 102, and configured to enable information interaction between the processor 101 and the storage 102.

The processor 101 is a device having data processing capability and includes, but is not limited to, a CPU or the like. The storage 102 is a device with data storage capability, and includes, but is not limited to, a Random Access Memory (RAM) (for example, a Synchronous Dynamic Random-Access Memory (SDRAM)), a Read-Only Memory (ROM), an Electrically Erasable Programmable Read-Only Memory (EEPROM), a FLASH Memory (FLASH). The I/O interface 103 coupled between the processor 101 and the storage 102 can realize information interaction between the processor 101 and the storage 102, and includes, but is not limited to, a data bus (Bus), or the like.

As an alternative implementation, the processor 101, the storage 102 and the I/O interface 103 are interconnected to each other via a bus 104 to further interconnect the other components of the distributed unit.

Figure 20:
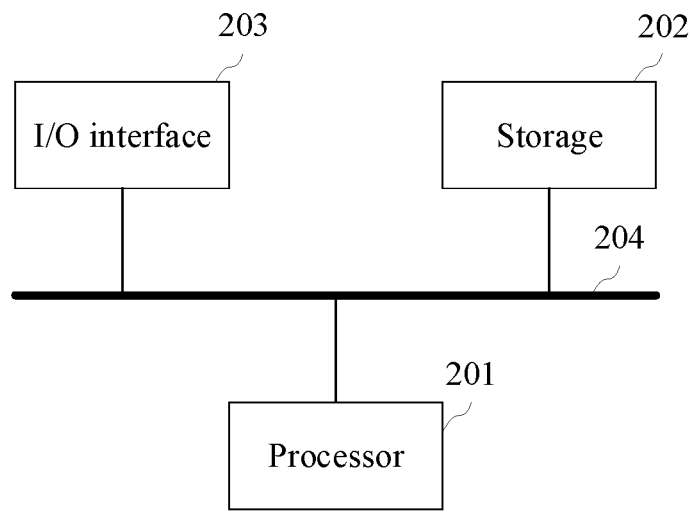
FIG. 20 is a block diagram illustrating a radio unit according to the present disclosure.

In a fourth aspect, referring to FIG. 20, the present disclosure provides a radio unit, including: at least one processor 201; a storage 202 on which at least one program is stored, which when executed by the at least one processor 201, causes the at least one processor 201 to implement the data processing method provided by any of the embodiments of the present disclosure; and at least one I/O interface 203 coupled between the processor 201 and the storage 202 and configured to enable information interaction between the processor 201 and the storage 202.

The processor 201 is a device with data processing capability and includes, but is not limited to, a CPU or the like. The storage 202 is a device having data storage capability, and includes, but is not limited to, a Random Access Memory (RAM) (for example, SDRAM, DDR, etc.), a Read Only Memory (ROM), an Electrically Erasable Programmable Read Only Memory (EEPROM), a FLASH memory (FLASH). The I/O interface 203 coupled between the processor 201 and the storage 202 can realize information interaction between the processor 201 and the storage 202, and includes, but is not limited to, a data bus or the like.

As an alternative implementation, the processor 201, the storage 202 and the I/O interface 203 are interconnected to each other via a bus 204 to further interconnect other components of the radio unit.

Figure 21:
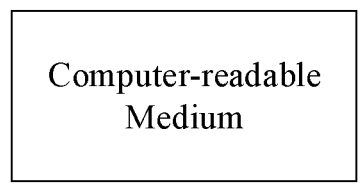
FIG. 21 is a block diagram illustrating a computer-readable storage medium according to the present disclosure.

In a fifth aspect, referring to FIG. 21, the present disclosure provides a computer-readable storage medium, on which a computer program is stored which, when executed by a processor, implements at least one of the following methods: the data transmission method provided by any of the embodiments of the present disclosure; or the data processing method provided by any of the embodiments of the present disclosure.

In order to enable those skilled in the art to more clearly understand the technical solutions provided by the embodiments of the present disclosure, the technical solutions provided by the embodiments of the present disclosure are described in detail below by specific examples.

First Example

Figure 22:
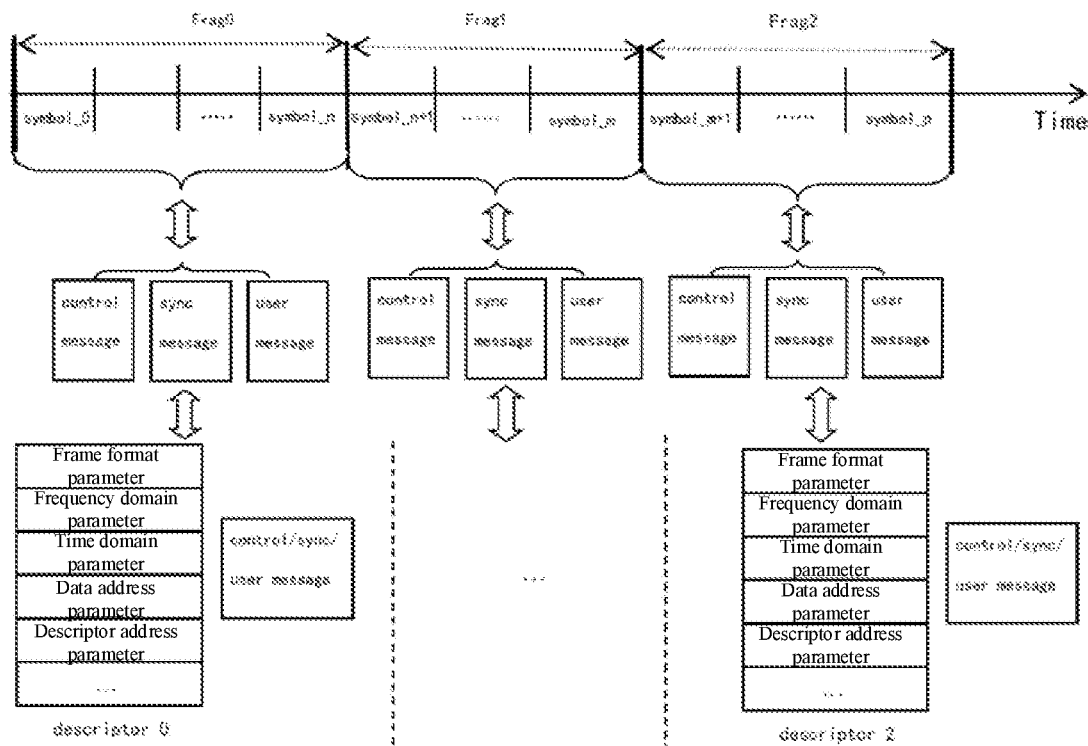
FIG. 22 is a schematic diagram illustrating a correspondence relationship between data fragments and descriptors according to the present disclosure.

As shown in FIG. 22, in the first example, the data to be transmitted includes data fragments Frag0, Frag1, Frag2, . . . ; each data fragment corresponds to a respective one descriptor, for example, the data fragment Frag0 corresponds to the descriptor descriptor0, and the data fragment Frag2 corresponds to the descriptor descriptor2, . . . . The data to be transmitted may be control data, user data, or time information; the descriptor includes a frame structure parameter, a frequency domain parameter, a time domain parameter, a data address parameter, and a descriptor address parameter.

Figure 23:
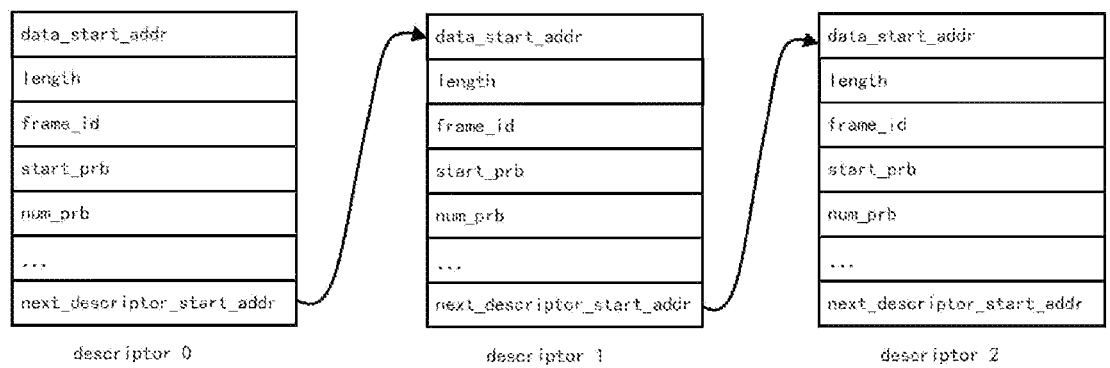
FIG. 23 is a schematic diagram illustrating a storage mode of descriptors according to the present disclosure.

In the first example, the descriptors may be stored discretely in the on-chip storage device. As shown in FIG. 23, the storage address of a next descriptor is used as one of the parameters of the current descriptor, so as to implement the chain storage of the descriptors, and the hardware logic obtains the storage location of the next descriptor by parsing the parameters in the current descriptor, thereby completing the reading and writing of all descriptors.

Figure 24:
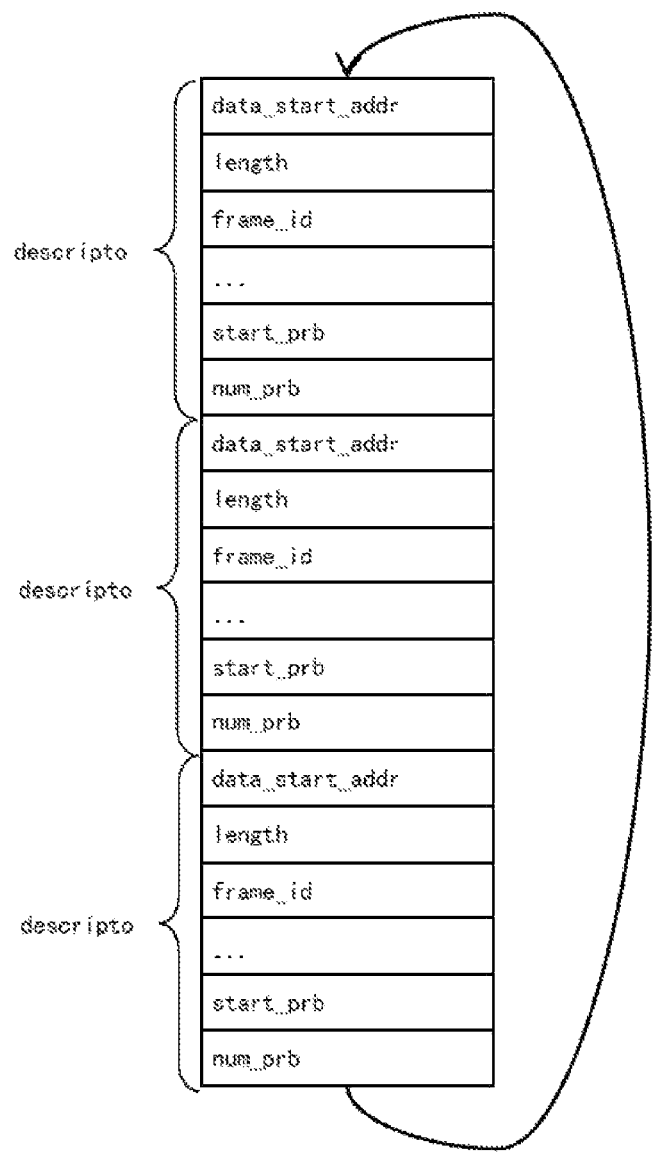
FIG. 24 is a schematic diagram illustrating another storage mode of descriptors according to the present disclosure.

The descriptors may also be stored contiguously in the on-chip storage device. As shown in FIG. 24, an address space is planned in advance as a dedicated storage space for the descriptors, the address of each parameter of the descriptors is fixed and known, and a general-purpose processor, an accelerator, a hardware logic, or the like, reads and writes the descriptors cyclically in the storage space.

In FIGS. 23 and 24, "data_start_addr" represents a start address of a current data fragment, "length" represents a length of stored data, "frame_id" represents a 10 ms frame number of the stored data fragment, "start_PRB" represents a start number of a PRB, "num_PRB" represents the number of PRBs used, and "next_descriptor_start_addr" represents a start address of a next descriptor.

Second Example

Figure 25:
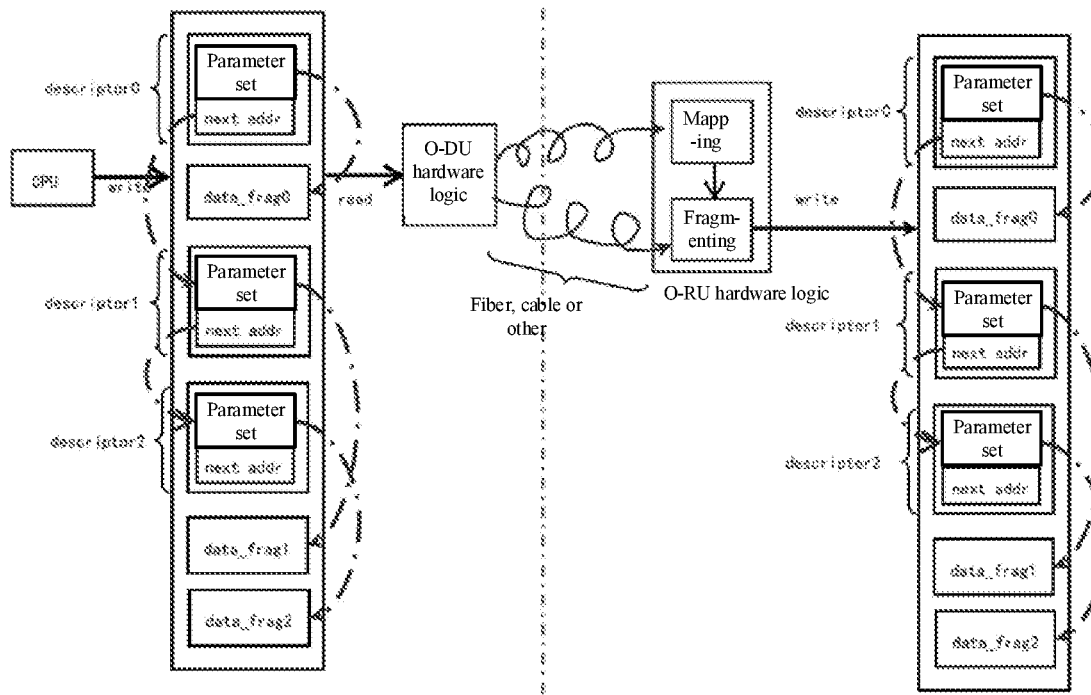
FIG. 25 is a diagram illustrating communication between an O-DU and an O-RU via a downlink according to the present disclosure.

FIG. 25 is a diagram illustrating communication between an O-DU and an O-RU via downlink.

The communication between the O-DU and the O-RU via the downlink may include the following process.

On the downlink O-DU side: the general-purpose processor or the accelerator fragments the data within a certain time at present, configures the starting position of the descriptor in the on-chip storage device and the descriptor parameters corresponding to each data fragment, and then writes the descriptors and the data fragments into the on-chip storage device. The fragmentation may be in units of symbols, each symbol being a respective one fragment, and allocating a respective storage space to each data fragment. Each data fragment corresponds to a respective one descriptor, and the relevant information of the data fragment may be translated into the parameters of the descriptor and written into the on-chip storage device. The storage mode of the data fragment is defined by parameters in the descriptor, such as a data storage strat address, a cache space size, and the like. The storage mode of the descriptor may be defined by a parameter in the descriptor, and may also be planned in advance. The fragmented data and the descriptors are stored in the on-chip storage device. The parameters in the descriptor define the addresses of the descriptor itself and the data fragment in the on-chip storage device, so that the general-purpose processor or hardware logic can correctly read the data in the on-chip storage device. The hardware logic periodically reads the descriptors in the on-chip storage device based on the starting position of the descriptor, which is configured by the general-purpose processor, and the position of the next descriptor defined by the parameter in the descriptor. After that, the corresponding data fragment is read at the specified address based on the read descriptor, and the corresponding data fragment is sent to the O-RU.

On the downlink O-RU side: the hardware logic on the O-RU side generates the descriptors in a mapping mode based on the received control data, and initializes the starting position of the descriptor. The hardware logic processes the received data based on the descriptors and writes the descriptors and corresponding data fragments to the on-chip storage device. The control data sent by the O-DU defines the format and size of the user data, such as the starting position of the resource blocks, the number of resource blocks and whether each resource block being used. The hardware logic on the O-RU side needs to extract the following parameters from the control data and map them to parameters in the descriptors: a data fragment label, a starting position of a data fragment storage space, a size of the data fragment storage space, and the like. The descriptors and the data are stored in fragments in the on-chip storage device.

Third Example

Figure 26:
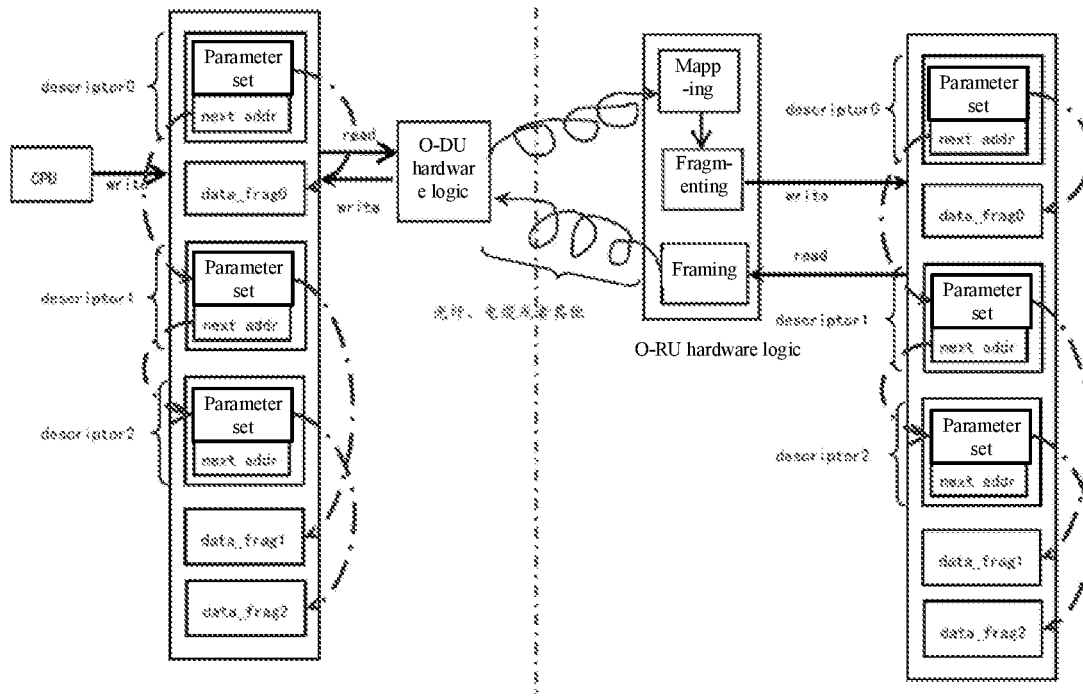
FIG. 26 is a diagram illustrating communication between an O-DU and an O-RU via an uplink according to the present disclosure.

FIG. 26 is a diagram illustrating communication between an O-DU and an O-RU via an uplink.

The communication of the O-DU and the O-RU through the uplink may include the following process.

On the uplink O-DU side: the O-DU only sends control information via the uplink, and the O-RU sends user data to the O-DU based on the received control information. The general-purpose processor or the accelerator fragments the data within a certain time at present, configures the starting position of the descriptor in the on-chip storage device and the descriptor parameters corresponding to each data fragment, and then writes the descriptors and the data fragments into the on-chip storage device. The fragmented data and the descriptors are stored in the on-chip storage device. The parameters in the descriptor define the addresses of the descriptor itself and the data fragment in the on-chip storage device, so that the general-purpose processor or hardware logic can correctly read the data in the on-chip storage device. The hardware logic periodically reads the descriptors in the on-chip storage device based on the starting position of the descriptor, which is configured by the general-purpose processor, and the position of the next descriptor defined by the parameter in the descriptor. After that, the corresponding data fragment is read at the specified address based on the read descriptor, and the corresponding data fragment is sent to the O-RU.

On the uplink O-RU side: the hardware logic on the O-RU side generates the descriptors in a mapping mode based on the received control data, and initializes the starting position of the descriptor. The hardware logic processes the received data based on the descriptors and writes the descriptors and corresponding data fragments to the on-chip storage device. The control data sent by the O-DU defines the format and size of the user data, such as the starting position of the resource blocks, the number of resource blocks and whether each resource block being used. The hardware logic on the O-RU side needs to extract the following parameters from the control data and map them to parameters in the descriptors: a data fragment label, a starting position of a data fragment storage space, a size of the data fragment storage space, and the like. The descriptors and the data are stored in fragments in the on-chip storage device. The hardware logic periodically reads the descriptors in the on-chip storage device based on the starting position of the descriptor and the position of the next descriptor defined by the parameter in the descriptor. After that, the data is read based on the read descriptor, and the read data is framed and sent to the O-DU or the next-stage module.

It will be understood by those of ordinary skill in the art that all or some of the operations of the methods, systems, functional modules/units in the devices disclosed above may be implemented as software, firmware, hardware, or suitable combinations thereof. In a hardware implementation, the division between functional modules/units mentioned in the above description does not necessarily correspond to the division of physical components; for example, one physical component may have multiple functions, or one function or operation may be performed by several physical components in cooperation. Some or all of the physical components may be implemented as software executed by a processor, such as a central processing unit, digital signal processor, or microprocessor, or as hardware, or as an integrated circuit, such as an application specific integrated circuit. Such software may be distributed on computer-readable media, which may include computer storage media (or non-transitory media) and communication media (or transitory media). The term computer storage media includes volatile and nonvolatile, removable and non-removable media implemented in any method or technology for storage of information such as computer-readable instructions, data structures, program modules or other data, as is well known to those skilled in the art. Computer storage media includes, but is not limited to, RAM, ROM, EEPROM, flash memory or other memory technology, CD-ROM, Digital Versatile Disks (DVD) or other optical disk storage, magnetic cassettes, magnetic tape, magnetic disk storage or other magnetic storage devices, or any other medium which can be used to store the desired information and which can accessed by a computer. In addition, communication media typically embodies computer-readable instructions, data structures, program modules or other data in a modulated data signal such as a carrier wave or other transport mechanism and includes any information delivery media as is well known to those skilled in the art.

Exemplary embodiments have been disclosed herein, and although specific terms are employed, they are used and should be interpreted in a generic and descriptive sense only and not for purposes of limitation. In some instances, features, characteristics and/or elements described in connection with a particular embodiment may be used alone or in combination with features, characteristics and/or elements described in connection with other embodiments, unless expressly stated otherwise, as would be apparent to one skilled in the art. It will, therefore, be understood by those skilled in the art that various changes in form and details may be made therein without departing from the scope of the present disclosure as set forth in the appended claims.

What is claimed is:

1. A data transmission method applied to an Open Radio Access Net (O-RAN) fronthaul, comprising:
    reading, from a local on-chip storage device and based on a plurality of descriptors, data to be transmitted corresponding to the plurality of descriptors; and
    transmitting the data to be transmitted based on the plurality of descriptors,
    wherein the plurality of descriptors are configured to define a storage mode of the data to be transmitted in the local on-chip storage device, and are intermediate parameters in an O-RAN Distributed Unit (O-DU) or an O-RAN Radio Unit (O-RU) for transmitting data in the local on-chip storage device, and an existence mode of the data to be transmitted on a transmission link during transmission of the data to be transmitted.

2. The method of claim 1, wherein the data to be transmitted comprises a plurality of data fragments, each of the plurality of descriptors corresponds to a respective one of the plurality of data fragments and comprises a data address parameter, and the data address parameter is configured with data storage information of the data fragment corresponding to the descriptor in the local on-chip storage device; and reading, from the local on-chip storage device and based on the plurality of descriptors, the data to be transmitted corresponding to the plurality of descriptors comprises:

reading, from the local on-chip storage device, the data fragment corresponding to the descriptor based on the data storage information configured in the data address parameter in the descriptor.

3. The method of claim 2, wherein the descriptor further comprises a frame format parameter configured with frame format information of the data fragment corresponding to the descriptor, a time domain parameter configured with time domain information of the data fragment corresponding to the descriptor and a frequency domain parameter configured with frequency domain information of the data fragment corresponding to the descriptor; and transmitting the data to be transmitted based on the plurality of descriptors comprises:

framing and transmitting the data to be transmitted based on the frame format information configured in the frame format parameter, the time domain information configured in the time domain parameter, and the frequency domain information configured in the frequency domain parameter in the descriptor of the plurality of descriptors.

4. The method of claim 1, wherein before reading, from the local on-chip storage device and based on the plurality of descriptors, the data to be transmitted corresponding to the plurality of descriptors, the method further comprises:

reading, from the local on-chip storage device, the plurality of descriptors.

5. The method of claim 4, wherein reading, from the local on-chip storage device, the plurality of descriptors comprises:

reading, from the local on-chip storage device, the plurality of descriptors periodically.

6. The method of claim 4, wherein the descriptor further comprises a descriptor address parameter configured with descriptor storage information, wherein the descriptor storage information is for characterizing storage information of a next descriptor of the descriptor in the local on-chip storage device; and reading, from the local on-chip storage device, the plurality of descriptors comprises:

read the next descriptor based on the descriptor storage information configured in the descriptor address parameter of the descriptor.

7. The method of claim 4, wherein storage addresses of the plurality of descriptors in the local on-chip storage device are contiguous; and reading, from the local on-chip storage device, the plurality of descriptors comprises:

reading, from a storage space of the local on-chip storage device for storing the plurality of descriptors, the plurality of descriptors based on a start address of the plurality of descriptors in the local on-chip storage device.

8. A distributed unit, comprising:
at least one processor; and
a storage having at least one program stored thereon which, when executed by the at least one processor, causes the at least one processor to implement the method of claim 1.

9. A non-transitory computer-readable storage medium having a computer program stored thereon which, when executed by a processor, causes the processor to implement the data transmission method of claim 1.

10. A data processing method applied to an O-RAN fronthaul, comprising:

generating a plurality of descriptors based on received control data, wherein the plurality of descriptors correspond to data to be transmitted corresponding to the control data; and writing the data to be transmitted into a local on-chip storage device based on the plurality of descriptors, wherein the plurality of descriptors are configured to define a storage mode of the data to be transmitted in the local on-chip storage device, and are intermediate parameters in an O-DU or an O-RU for transmitting data in the local on-chip storage device, and an existence mode of the data to be transmitted on a transmission link during transmission of the data to be transmitted.

11. The method of claim 10, wherein the data to be transmitted comprises a plurality of data fragments, each of the plurality of descriptors corresponds to a respective one of the plurality of data fragments and comprises a data address parameter; and generating the plurality of descriptors based on the received control data comprises:

configuring, based on the control data, data storage information in the data address parameter for storing the data fragment corresponding to the descriptor in the local on-chip storage device.

12. The method of claim 11, wherein the descriptor further comprises a frame format parameter, a time domain parameter and a frequency domain parameter;

generating the plurality of descriptors based on the received control data comprises:

generating the descriptor corresponding to the data segment based on the control data; and generating the descriptor corresponding to the data segment based on the control data comprises:

configuring, based on the control data and in the frame format parameter, frame format information of the data fragment corresponding to the descriptor;

configuring, based on the control data and in the time domain parameter, time domain information of the data fragment corresponding to the descriptor; and configuring, based on the control data and in the frequency domain parameter, frequency domain information of the data fragment corresponding to the descriptor.

13. The method of claim 12, wherein the data to be transmitted comprises uplink data to be transmitted; and before writing the data to be transmitted into the local on-chip storage device based on the plurality of descriptors, the method further comprises:

fragmenting, based on storage address information configured in the descriptor, the uplink data to be transmitted to obtain the plurality of data fragments corresponding to the plurality of descriptors.

14. The method of claim 12, wherein the data to be transmitted comprises downlink data to be transmitted; and before writing the data to be transmitted into the local on-chip storage device based on the plurality of descriptors, the method further comprises:

processing the downlink data to be transmitted based on the frame format information configured in the frame format parameter, the time domain information configured in the time domain parameter and the frequency domain information configured in the frequency domain parameter in the descriptor of the plurality of descriptors, to obtain the plurality of data fragments corresponding to the plurality of descriptors.

15. The method of claim 11, wherein writing the data to be transmitted into the local on-chip storage device based on the plurality of descriptors comprises:

writing the data segment into the local on-chip storage device based on the data storage information configured in the data address parameter in the descriptor corresponding to the data segment.

16. The method of claim 11, wherein the descriptor comprises a data address parameter, and generating the plurality of descriptors based on the received control data comprises:

determining a plurality pieces of descriptor storage information of the plurality of descriptor in the local on-chip storage device; and configuring, in the descriptor address parameter, descriptor storage information of a next descriptor in the local on-chip storage device.

17. The method of claim 11, further comprising:

reading, based on the plurality of descriptors, the data to be transmitted corresponding to the plurality of descriptors stored in the local on-chip storage device; and transmitting the data to be transmitted based on the plurality of descriptors.

18. The method of claim 17, wherein reading, based on the plurality of descriptors, the data to be transmitted corresponding to the plurality of descriptors stored in the local on-chip storage device comprises:

reading, from the local on-chip storage device, the data segment corresponding to the descriptor based on the data storage information configured in the data address parameter in the descriptor.

19. A radio unit, comprising:

at least one processor; and a storage having at least one program stored thereon which, when executed by the at least one processor, causes the at least one processor to implement the method of claim 10.

20. A non-transitory computer-readable storage medium having a computer program stored thereon which, when executed by a processor, causes the processor to implement the data processing method of claim 10.

* * * * *